Feb. 27, 1951   J. R. HUTCHINSON   2,543,240
FOLDABLE VIEWER
Filed Jan. 16, 1948   2 Sheets-Sheet 1
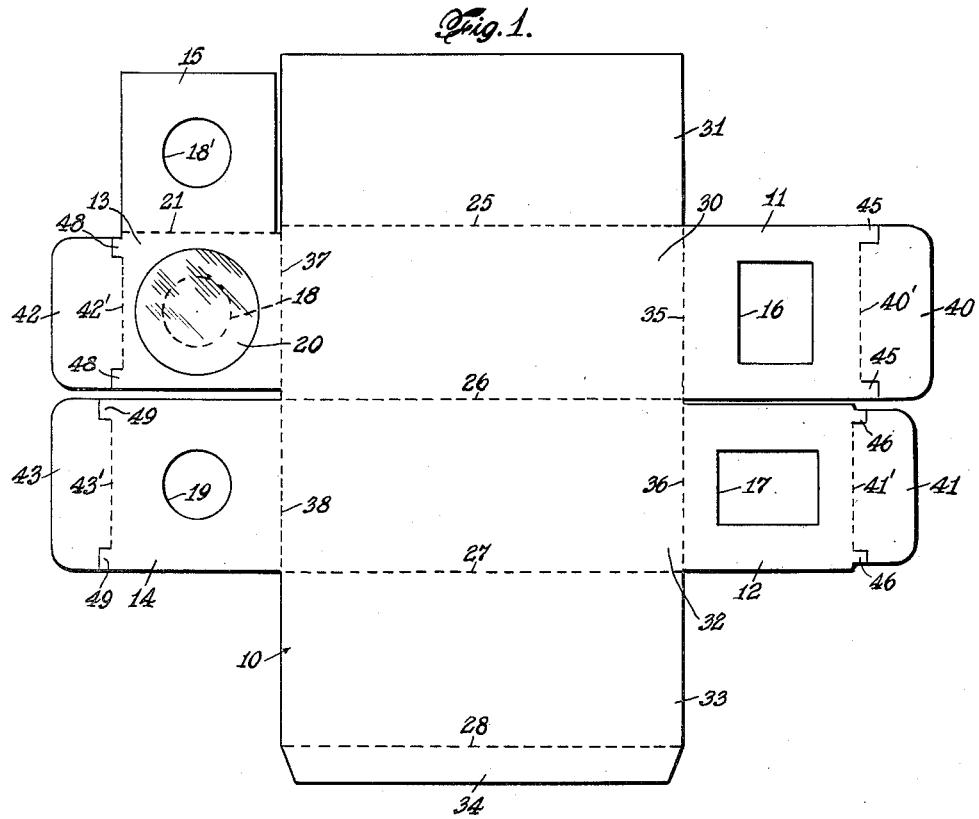
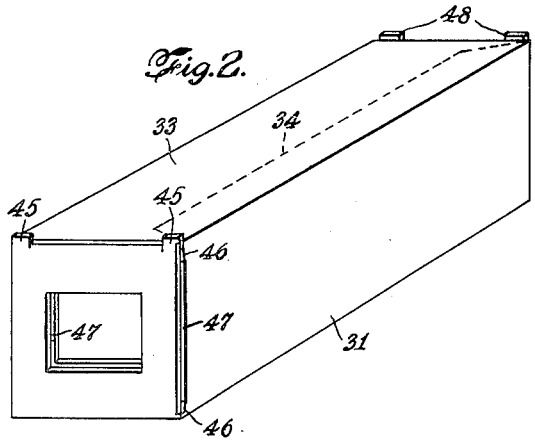
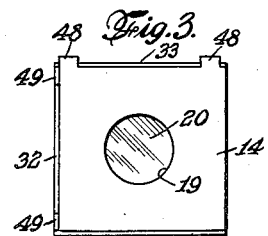
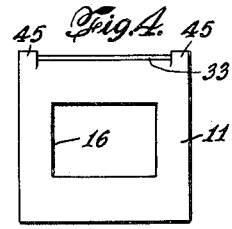
INVENTOR.
J. RAYMOND HUTCHINSON
BY
Fred'k F. Schuetz
ATTORNEY.

Feb. 27, 1951          J. R. HUTCHINSON          2,543,240
FOLDABLE VIEWER
Filed Jan. 16, 1948          2 Sheets-Sheet 2
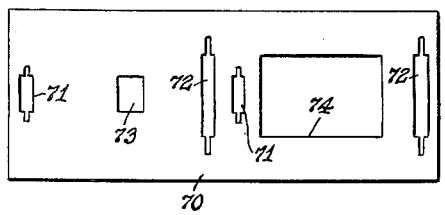
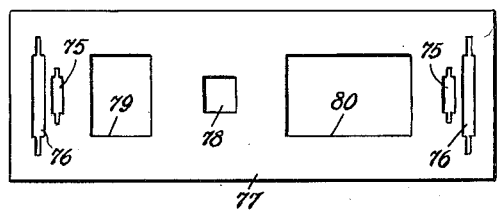
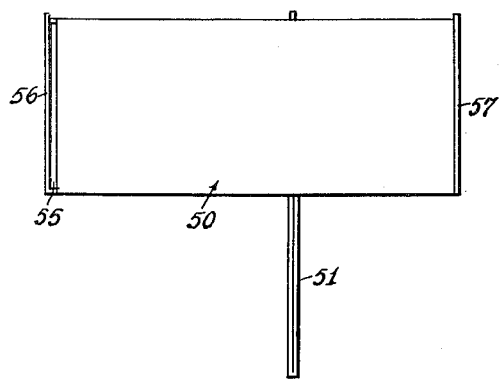
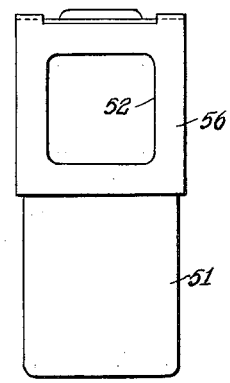
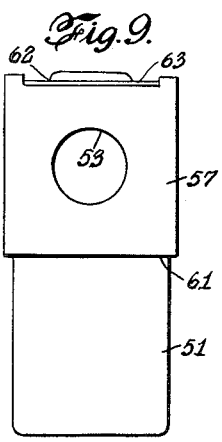
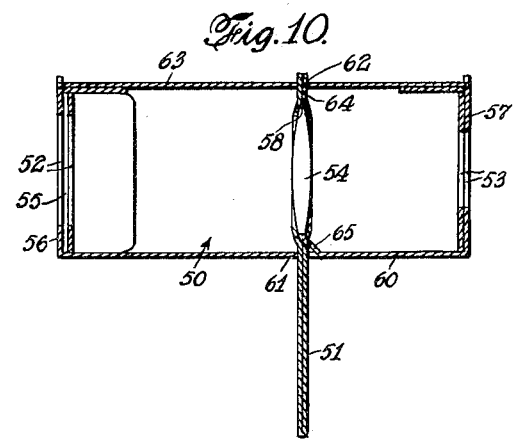
INVENTOR.
J. RAYMOND HUTCHINSON
BY
ATTORNEY.

Patented Feb. 27, 1951

2,543,240

UNITED STATES PATENT OFFICE 2,543,240

FOLDABLE VIEWER

John Raymond Hutchinson, Paradise, Pa.

Application January 16, 1948, Serial No. 2,764

9 Claims. (Cl. 40—28)

The invention relates to picture viewers, more especially to those designed to receive a film frame or frames supported, for example, in a suitable mount or slide; or to receive merely successive frames of a film strip bearing pictures. Various types of such viewers are known but, generally, they are of relatively expensive construction.

It is an object of the invention to provide a shadow-box type of viewer of novel and comparatively inexpensive construction, and a box simple to use.

Another object of the invention is to provide a viewer of the aforesaid type of construction which will admit of the use of flat and relatively inexpensive stock for providing the shadow box, the material of the same admitting of stamping out the box blank therefrom for subsequent folding to complete the box for use.

Still another object of the invention is to provide a foldable viewer or shadow box construction involving minimum space requirements, after collapse, when not in use or for shipment, thus rendering it a suitable item for a mail order business, the setting up of the viewer for use thereafter not requiring particular mechanical skill.

A further object of the invention is to provide a shadow-box type of viewer with magnifying lens, and one which will accommodate customary picture mounts or slides for either 16 mm. or 35 mm. frames, as well as mounts for a plurality of picture frames or even an unmounted film strip bearing a plurality of frames.

A still further object of the invention is to provide a novel mount for use in the viewer whereby picture frames of more than one size may be accommodated.

It is an object of the invention, also, to provide a lens holder either as a permanent or integral part of the box or as a member to be associated therewith in a manner such as to serve as a means for conveniently supporting the box manually.

In carrying out the invention, the novel shadow box viewer is conveniently constructed by stamping out of suitable material such as cardboard, strawboard and the like a blank having end wings cut for folding into cooperative relationship to provide at one end an opening with a transversely located open-sided gate or holder to receive a slide or the like. The wings at the opposite end are designed to provide a sight opening for viewing a picture and wherein there may be retained also a magnifying lens; or, the lens may be carried by a separable element or strip of stiff material, which strip is then designed to be introduced into the box transversely to its longitudinal axis through oppositely disposed slots provided intermediate the box ends in respective walls of said box. The said strip, preferably, is so constructed as to serve also as a member for supporting manually the box as a whole when viewing a picture.

Provision may be made, also, to mount a length of film strip upon a suitable carrier or holder for the film strip, which carrier may be constructed to receive either a 16 mm. film or a 35 mm. film, or both; and when inserted in the gate will project beyond the upper surface of the shadow box to afford an abutment preventing the film strip coil from falling over the gate.

The nature of the invention, however, will best be understood when described in connection with the accompanying drawings, in which:

Fig. 1 is a plan view of a blank stamped out of suitable material in such a manner that it is possible to construct the novel shadow box viewer therefrom merely by folding and anchoring the same, including integral wings thereof.

Fig. 2 is a view, in perspective, of the novel shadow box viewer as made up from the blank shown in Fig. 1.

Figs. 3 and 4 are respectively rear and front elevations of the viewer.

Figs. 5 and 6 are plan views illustrating different forms of film holders which may be utilized in the novel viewer.

Fig. 7 is a plan view and Figs. 8 and 9 are respectively a front elevation and a rear elevation illustrating a modification in the construction of the viewer.

Fig. 10 is a longitudinal section through the viewer illustrated in Figs. 7–9, inclusive.

Referring to the drawings, more particularly Figs. 1–4, inclusive, a novel shadow box picture viewer is shown as constructed from a flat sheet or blank 10, Fig. 1, of generally rectangular shape having oppositely disposed sets of wings, one set comprising the wings 11 and 12 and the opposite set the wings 13 and 14, of which the one wing 13 has associated therewith a laterally extending auxiliary wing 15. Of the first-mentioned set of wings, the wing 11 is provided with a rectangular frame aperture 16, and the wing 12 with a similarly sized frame aperture 17 but positioned at right angles thereto so that when the blank and wings are folded as hereinafter set forth, the two apertures will register.

In the case of the other set of wings, wing 13 is provided with a circular sight aperture 18 adapted to register with a similar sight aperture 19 of the wing 14 when the said wings are juxtaposed. Wing 13 carries also a lens element 20 which may be adhesively secured thereto along its circumference and over the aperture 18, being further held between the wing element 13 and its auxiliary element 15 by folding the latter thereover along its junction with wing 13, this junction being scored to this end as indicated at 21. Auxiliary wing 15 thus folded may be secured to the wing 13 either by means of an adhesive or by stapling the same thereto, and is provided with a sight aperture 18' adapted in its folded location for registry with the sight apertures 18 and 19.

The blank portion 10 is scored transversely along the lines 25, 26, 27, and 28 to permit of bending the blank along said scorings to provide thereof, for example, the bottom 30 of the box, the one side wall 31 and the opposite side wall 32 thereof, as well as the top 33. The top element 33, furthermore, is provided with an extension or tab 34 adapted to be bent at right angles thereto along the scoring 28 to engage with the inner surface of the side wall 31 when the latter is bent upwards at right angles about the scoring 25, and may be attached thereto either by an adhesive or by stapling the same, or otherwise.

After the body of the shadow box has thus been assembled, the sets of wings are folded about scorings along respective longitudinal lines 35—36 and 37—38 to close the respective ends of the box, except for the juxtaposed frame apertures 16—17 and the sight aperture 18—18'—19.

To secure these wings in their closure locations, suitable tabs 40 and 41 are provided for wing elements 11 and 12, and tabs 42, 43 for wing elements 13 and 14. These tabs are bendable at right angles to the corresponding wing elements as along the longitudinal scorings 40', 41' and 42', 43', respectively, frictionally holding thereby the wing element 11 against the under face of top 33 and the wing element 12 against the side wall 31, and the wing element 13 with auxiliary wing element 15 against the under face of the top 33 and wing element 14 against the side wall 31. In order to prevent the respective pairs of wing elements 11, 12 and 13, 14 from extending too far into the interior of the box, the respective tabs 40 and 41 are cut to provide at the scoring lines 40'—41' pairs of ears 45 and 46, which then engage the corresponding edges of the side 31 and top 33, Figs. 2 and 4. In juxtaposing these frame apertures 16, 17, furthermore, the juxtaposition of their two wing elements is made such as to leave therebetween lateral openings 47 through which may be introduced a film mount or simply a strip of film having the pictures thereon for viewing in the shadow box as will be hereinafter more fully set forth.

Similarly, in the case of the tabs 42 and 43, pairs of ears 48 and 49 are provided to engage respectively the corresponding edges of top 33 and side 31, Fig. 3.

A modification in the mounting of the lens is indicated in Figs. 7–10, inclusive, said lens in this embodiment being removably mounted in the shadow box 50 as on a suitable carrier 51, rather than in the hereinbefore described wing elements 13 and 15. The box structure is otherwise similar with the exception that auxiliary wing 15, no longer being required to retain a lens element 20, is omitted, together with the scoring 21.

The frame apertures 52 and the sight apertures 53 are coaxially arranged as in the previously described embodiment with respect to the lens 54 to be inserted and lateral openings 55 are provided between the frame aperture wing elements 56 to admit the picture mount or film strip which is to be viewed through the openings 53 in the wing elements 57. As indicated, the lens 54 is conveniently mounted between a doubled-over piece of cardboard or the like provided as a rectangular strip, and suitably apertured at 58 to expose said lens. To permit of introducing the carrier 51 with lens, the one side 60 of the box is provided with a transverse slot 61 and a similar but shorter slot 62 is provided in the opposite side 63 of the box, the two slots being aligned to position the lens at right angles to the optical axis of the said box and in the proper focus. By reducing the length of slot 62 and also the width of the carrier 51 at its outer end, a tab 64 is provided adapted for engagement with the inner face of side 63 to shoulder the holder or carrier against said inner face. In addition, in providing the slot 61, this may be effected by a single cut and then bending inwardly into the box the resulting tab 65. The latter then serves to press against the body of said carrier to assist in firmly holding it in the supporting location.

The constructions hereinbefore described admit of providing for storage or shipment of a shadow box viewer of the nature set forth in knockdown state as merely in the form of the blank indicated in Fig. 1, or, preferably, in assembled relationship as indicated in Figs. 2 and 7. These latter forms admit of collapse along diagonally opposite scoring lines, it being understood that the wings are first withdrawn and, in the case of the embodiment shown in Fig. 7, also lens carrier 51.

While the usual picture slides may be utilized by inserting them through openings 47 or 55, and while a strip of the usual picture film may be manually passed directly therethrough for display of the picture frames, it is generally more convenient to hold such film in a carrier mount, for example, as illustrated in Figs. 5 and 6, which mount with threaded film strip is then positioned between the frame aperture members and the film shifted as required. This admits also of accommodating both 16 mm. and 35 mm. films in the same mounting as well as admitting of the viewing of a single frame or simultaneously two frames, as may be desired.

As indicated in said Figs. 5 and 6, the carrier mount 70, Fig. 5, is in the nature of an elongated, substantially rigid strip having a pair of transverse anchoring slots 71 through which a film is to be threaded, and a pair of further transverse anchoring slots 72 of length differing from the length of slots 71, said pairs being adapted to accommodate respectively film, say, of 16 mm. width and film, say, of 35 mm. width. These slots are displaced longitudinally along the strip and between the respective pairs of slots is provided a frame aperture, for example, the aperture 73 designed to register a 16 mm. film and an aperture 74 designed to register a double frame of 35 mm. width.

In Fig. 6 a slight modification is indicated in that respective slots of the slot pairs 75 and 76 are located at opposite ends of the carrier mount 77 and all of the frame apertures are located therebetween. Thus, the aperture 78 for a 16 mm. film may be located intermediate, in this particular embodiment, two apertures 79 and 80 for 35 mm. film, the former aperture being adapted to display a single frame only and the latter two frames of said film.

Both types of the mounts provide, when inserted in the gate of the novel shadow box, a portion external thereto which projects sufficiently above the corresponding surface to prevent the coil of the threaded film from falling over the gate as the film strip is drawn manually through the mount to present successive frames for viewing.

I claim:

1. A collapsible shadow box picture viewer substantially rectangular in cross-section and having at one end integral folded means normally closing said end but affording a sight aperture therethrough, said means being manually withdrawable for effecting collapse of the box, and integral cooperative folded means normally closing the opposite end of said box relatively displaced to receive and retain a picture therebetween and having respective apertures registering with each other when the means are folded, said means being withdrawable for effecting the collapse of the said box, and a lens supported intermediate the picture-retaining means and the outer of the sight apertures of the erected box.

2. An elongated and collapsible picture viewer, substantially rectangular in cross-section, of the shadow-box type and composed of a single blank of bendable material having a rectangular scored portion, said material being bent along the scorings to afford the bottom, top, and side walls of the box; and sets of wings extending from the bottom and an adjacent side at their opposite ends and scored along their junctions therewith, one set of the wings being perforated and folded at their junction scorings over each other to provide juxtaposed registering frame apertures displaced from each other to afford an intermediate picture receiving space with side openings to admit a picture, the other set of the wings being perforated and folded at their junction scorings over each other to provide juxtaposed openings affording a sight aperture for viewing a picture located in the picture receiving space, both of the sets of wings being withdrawable for effecting the collapse of said box, and a lens supported intermediate the picture-retaining space and the outer of the sight apertures of the erected box.

3. A shadow box picture viewer according to claim 2, wherein each of the wing elements of the respective pairs is provided with a bendable tab adapted to be turned inwardly to engage the inner surface of a corresponding wall.

4. A shadow box picture viewer according to claim 3, wherein the frame-aperture-forming wings are each provided with a pair of ears at the fold line of their respective tabs, said ears engaging with corresponding edges of the corresponding walls when the said tabs are turned inwardly.

5. A shadow box picture viewer according to claim 2, wherein one of the sight aperture wings is provided with a laterally extending and bendable auxiliary wing, scored at its junction therewith and folded at the scoring over said one wing, and a lens is retained between the said one wing and its folded auxiliary wing.

6. A shadow box picture viewer according to claim 2, wherein two opposite walls are provided with respective transverse aligned slots, and a rigid lens holder with lens is adapted to fit therein to align the lens optically with the picture receiving space and the sight aperture.

7. A shadow box picture viewer according to claim 6, wherein the slot in one wall is shorter than the slot in the other wall, and the lens holder has a narrow tab at its upper edge to fit the shorter slot, projects through the top and shoulders the holder against the inner face of the said one wall and each side whereby it may serve to make the viewer more rigid and to provide a manual support for the viewer through an externally projecting portion of said holder.

8. A blank adapted for assembly into a picture viewer, comprising a flat sheet of bendable material of substantial thickness, said sheet being of generally rectangular shape and scored transversely for bending along said scorings to afford elements constituting the bottom, top and side walls of the viewer, the top-forming element having a lateral extension scored at its junction with the top-forming element and adapted for folding under a side wall element to be secured thereto, and sets of perforated wings extending from the bottom element and an adjacent side wall element at their opposite ends and scored along their junctions therewith, the respective wings of a set being foldable over each other to register the corresponding perforations and each having a respective terminal tab bendable at right angles to the corresponding wings to retain frictionally said wings in position.

9. A blank for assembly into a picture viewer according to claim 8, wherein the tabs at their junction with their respective wings are cut to provide lateral pairs of ears extending from the corresponding wings for precise positioning of the latter when folded.

J. RAYMOND HUTCHINSON.

REFERENCES CITED

The following references are of record in the file of this patent:

UNITED STATES PATENTS

| Number | Name | Date |
| --- | --- | --- |
| 1,487,173 | Manion | Mar. 18, 1924 |
| 2,071,120 | Harlow | Feb. 16, 1937 |
| 2,105,025 | Curtis | Jan. 11, 1938 |
| 2,134,971 | Guyer | Nov. 1, 1938 |
| 2,153,221 | Wittel | Apr. 4, 1939 |